April 15, 1930.  H. D. BARR  1,755,145
BLOW-OFF OR MUD VALVE
Filed March 17, 1928
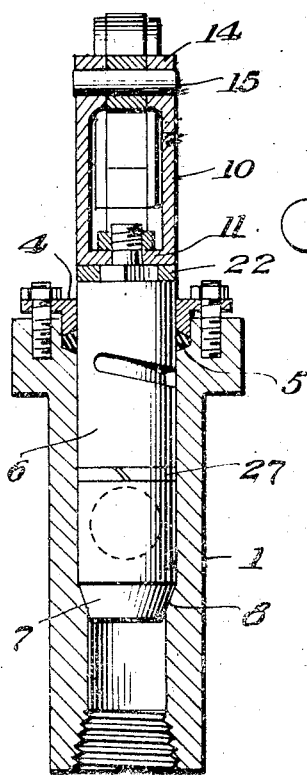
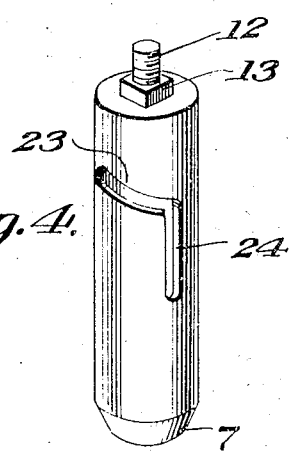
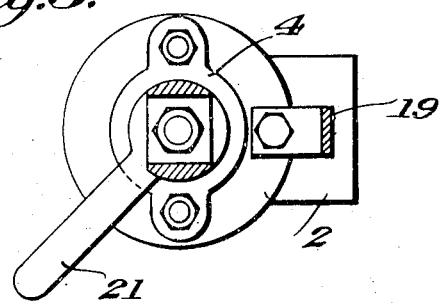
Harry Donaldson Barr
INVENTOR
BY Victor J. Evans
ATTORNEY Patented Apr. 15, 1930

1,755,145

UNITED STATES PATENT OFFICE

HARRY DONALDSON BARR, OF JACKSON, MISSISSIPPI, ASSIGNOR OF FORTY-NINE ONE-HUNDREDTHS TO B. B. McCLENDON AND L. L. POSEY, OF JACKSON, MISSISSIPPI

BLOW-OFF OR MUD VALVE

Application filed March 17, 1928. Serial No. 262,515.

This invention relates to blow-off or mud valves and its general object is to provide a valve of this type that is held firmly on its seat but can be actuated in an easy and expeditious manner by the mere movement of levers, as screw threads and the like that necessitate rotation of the valve stem during the opening and closing of the usual valve have been dispensed within the present application.

A further object of the invention is to provide a valve of the character referred to that is possessed with a long life, has no seating gaskets to change or become loose, and the seat for my type of valve due to the configuration thereof will prevent the accumulation of dirt, scale or foreign matter thereon.

Another object of the invention is to provide a blow-off or mud valve, that is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a detail view of my valve with parts in section and side elevation and also with parts in full and dash lines.

Figure 2 is a sectional view taken approximately on line 2—2 of Figure 1.

Figure 3 is a sectional view taken approximately on line 3—3 of Figure 1.

Figure 4 is a detail view of the core of my valve.

Referring to the drawings in detail, the reference numeral 1 indicates the valve casing that has formed therewith and extending laterally therefrom a nipple 2 which provides the inlet means for said valve, while the lower end of the casing provides the outlet therefor.

The nipple as well as the lower end of the casing is provided with a flared bore having screw threads and for distinction the outlet is indicated by the reference numeral 3. The upper end of the casing is provided with a threaded recess to receive a gland nut 4 which has disposed between the same and the casing proper packing 5 that provides a leak proof connection between the casing and the core 6 of the valve.

The casing is bored to slidably accommodate the core 6 which is cylindrical in shape and its seating end which is indicated by the reference numeral 7 is tapered as shown, to conform to the tapered seat 8 provided in the casing just below the passage of the nipple 2 as best shown in Figure 1. The bore that receives the core 6 is slightly larger than the passage 9 beyond the bore so as to provide the seat 8 as will be apparent.

The core as above suggested is mounted for reciprocation in its bore for controlling communication between the inlet and outlet 2 and 3 respectively, and the means for reciprocating the core includes a yoke 10 that is provided with an opening in its bight portion 11 for the purpose of accommodating the threaded shank 12 formed with a square cornered block 13 that is in turn formed with the upper end of the core as best shown in Figure 4.

The bight portion of the yoke 10 is seated upon the block 13 and the arms of the yoke are provided with apertured ears 14 at their upper ends to receive a pivot pin 15 which has pivotally secured thereto a lever 16.

The lever 16 is provided with a handle 17 formed therewith and is pivotally received by the pin 15 intermediate its ends, while the end of the lever 16, that is opposite the handle 17, is pivotally secured between one of the ends of a pair of strips 18, while the opposite ends of the strips are pivotally secured to the upper end of a bracket 19 which is bent at right angles between its ends and secured to the casing 1 through the instrumentality of a screw bolt 20. By this construction, it will be apparent that the core is capable of being easily and expeditiously moved to its operative and inoperative positions for controlling the passage between the inlet and outlet.

In order to fixedly secure the core on its seat, I provide a handle 21 that is formed with a head 22 disposed between the top of the core and the bight portion of the yoke 10, and this head is provided with a square cornered opening of a size to fit the square cornered block 13. Formed in the core is a substantially spirally arranged portion 23 of a slot which opens at one end in a longitudinally disposed portion 24, the portion 23 extending about the core for a portion of its circumference as clearly shown in Figure 4, and arranged for movement in the slot is a stud 25 formed on the inner end of a screw bolt 26 which is threadedly secured in the casing as best shown in Figure 1.

The stud not only limits the movement of the core in its upward direction, but when the stud is received in the spirally arranged portion of the slot, it fixedly secures the core on its seat as above set forth. The core is rotated for moving the portions of the slot with respect to the stud 25 through the medium of the handle 21.

From the above description and disclosure of the drawings, it will be obvious that I have provided a valve that can be quickly operated, and assuming that the valve core is seated as shown in full lines in Figure 1, the handle 21 is rotated for moving the portion 23 of the slot from the stud, so that the slot will be disposed with the stud at the upper end of the portion 24. The lever 16 is then raised to the dotted line position, with the result the core will be raised accordingly. The reverse operation is necessary to close the valve.

Steam retaining rings 27 are provided to prevent steam from escaping about the core or plunger 6.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A valve of the character described comprising a casing, a nipple formed with said casing and being provided with screw threads, said nipple providing the inlet for the valve, said casing having a passage flared at its lower end and providing the outlet, a core mounted for reciprocation in a bore communicating with the passage and nipple and being adapted to control communication between the outlet and nipple, means for reciprocating said core, a valve seat for said core, a stud guided in a slot formed in said core when the core is rotated for fixedly securing said core on its seat, and means for rotating said core for moving the slot with respect to the stud.

2. A valve of the character described comprising a casing provided with an inlet and outlet, a core mounted for reciprocation in said casing and controlling communication between the inlet and outlet, a seat for said core, a yoke secured to said core, a lever pivotally secured between its ends to said yoke, means pivotally receiving one end of said lever, a handle formed on the opposite end of said lever, a stud carried by said casing and mounted for movement in a slot formed in said core, and means for rotating said core for moving the slot with respect to said stud to lock and unlock the core with respect to its seat.

HARRY DONALDSON BARR.